C. W. MILLET.
CASTER WHEEL AND METHOD OF MAKING SAME.
APPLICATION FILED JAN. 3, 1920.
1,397,171.
Patented Nov. 15, 1921.
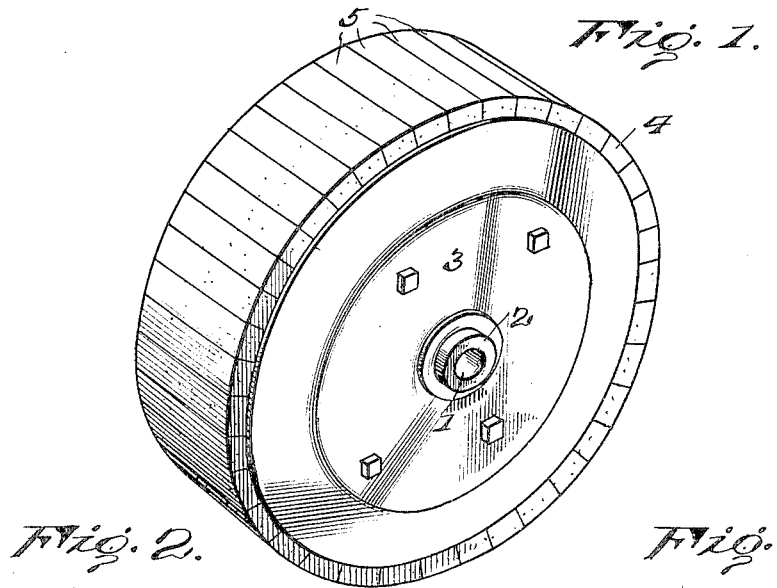
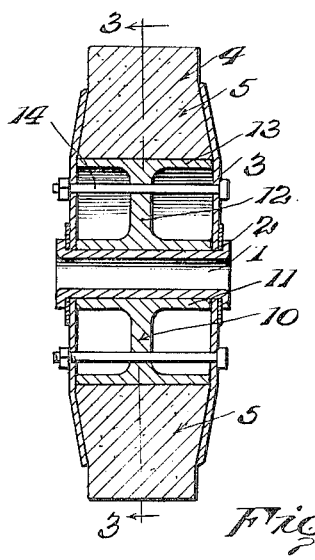
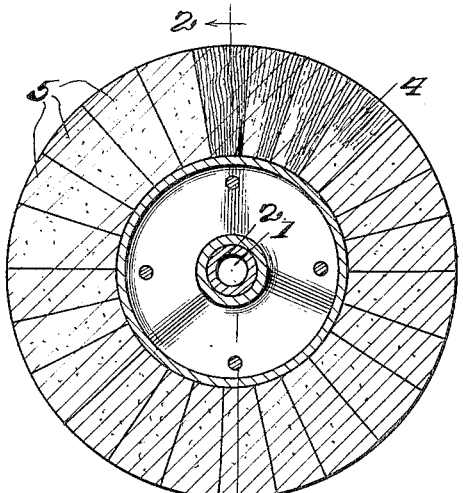
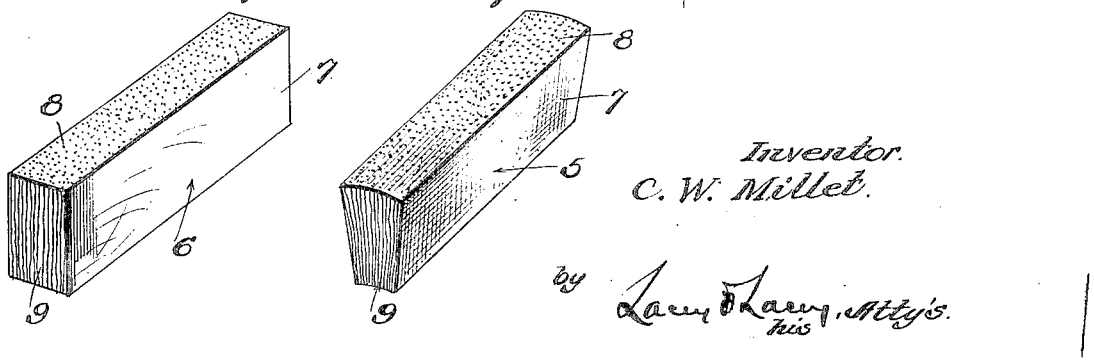
Inventor.
C. W. Millet.
by Larry & Larry, Atty's.
his

UNITED STATES PATENT OFFICE.

CHARLES W. MILLET, OF EVANSVILLE, INDIANA.

CASTER-WHEEL AND METHOD OF MAKING SAME.

1,397,171.                  Specification of Letters Patent.       Patented Nov. 15, 1921.

Application filed January 3, 1920. Serial No. 339,318.

*To all whom it may concern:*

Be it known that I, CHARLES W. MILLET, a citizen of the United States, residing at Evansville, in the county of Vanderburg and State of Indiana, have invented certain new and useful Improvements in Caster-Wheels and Methods of Making Same, of which the following is a specification.

This invention relates to improvements in caster and similar wheels and also to a novel method of manufacturing the same.

The improvements are directed more particularly to a caster or similar wheel having a wooden or similar fibrous tread, and the primary object of the present invention is to so prepare the elements comprising said tread and to so arrange the same that at all points in the circumference of the tread, the fibers will be radial to the axis of the wheel and will thus have their ends presented at the tread surface. The object of this construction is to render the tread exceptionally durable and free from liability of chipping or splintering. It is quite obvious that should the tread be formed from an annular piece cut from a single piece of wood or like fibrous material, the fibers, in the major portion of the circumference of the tread would extend chordal to the said circumference and these portions of the tread would soon be splintered off in the use of the wheel. It is also obvious that should the tread be formed in segments and should the segments be cut down to the proper segmental form so as to form a composite annular body when all of them were assembled, not all of the fibers in each segment would be radial to the axis of the wheel so that in this case also there would be likelihood of chipping off of portions of the tread so as to in a short time greatly impair the efficiency of the wheel. The present invention therefore contemplates forming the tread of such a wheel of a number of sections or segments assembled in an annular series, the segments being so acted upon by the method of the invention that all of the fibers in each segment will extend directly radial to the axis of the wheel or, in other words, will extend along lines parallel to the planes of the opposite side faces of the respective segment, each segment being, of course, of less thickness at its inner edge than at its outer edge or, in other words, in the form of a true segment of an annulus. By forming the segments in this manner, an exceptionally durable tread is provided and one which will be entirely free from likelihood of chipping or splintering.

In the accompanying drawings:

Figure 1 is a perspective view of a caster wheel constructed in accordance with the present invention;

Fig. 2 is a diametric section thereof on the line 2—2 of Fig. 3;

Fig. 3 is a vertical sectional view on the line 3—3 of Fig. 2;

Fig. 4 is a perspective view of one of the segments of the tread before treatment in accordance with the method of the invention;

Fig. 5 is a similar view illustrating the form of the segment after treatment.

In the drawings the numeral 1 indicates in general the hub of the caster wheel, which hub is in the nature of a tubular body designed to have its ends overturned or riveted down as indicated by the numeral 2 so as to retain the side plates or disks 3 of the wheel which disks bind at their peripheries against the opposite side faces of the tread of the wheel, which tread is indicated in general by the numeral 4. The tread of the wheel is made up of a number of segments 5 assembled in an annular series and firmly held in their assembled relation by the binding action of the peripheries of the disks 3 against their end faces as stated above. These segments, in the present instance, are of wood although it will be understood that any similar fibrous material may be employed for the purpose provided the fibers of the material all run in a corresponding direction.

In preparing each segment 5, I carry out the following method:—A rectangular block of the wood or other fibrous material from which the segment is to be formed is first prepared and this block has the general shape shown in Fig. 4 of the drawings and is indicated by the numeral 6. In preparing this block the same is cut from the mass of material in such a manner that the opposite side faces of the block, indicated by the numeral 7, will occupy planes parallel to each other and to the line of extent of the fibers or grain of the wood so that the ends of the fibers will be presented at the inner and outer edge faces of the block, one of these faces being indicated by the numeral 8 and being the one which is to constitute the tread face of the segment in its completed form, and the other face being indicated by the numeral 9 and being that face which is to be located opposite the tread face in the completed form of the segment or, in other words, being that edge face or segment which is to be presented toward the hub 1 or axis of the wheel. Having prepared this blank, the same is subjected to relatively great pressure in any suitable manner as for example between pressure heads, rollers, or in fact any coacting elements capable of functioning to exert the required degree of pressure. This pressure is exerted against the opposite side faces 7 of the blank and therefore in a direction at right angles to the lines of extent of the fibers of the blank and the pressure is so applied that the maximum degree of pressure will be exerted against the side faces 7 at and adjacent the inner edge face 9 of the blank and the minimum pressure will be exerted at and adjacent the tread face 8 of the blank. As a result of thus compressing the blank, the same will be caused to assume the permanent segmental form shown in Fig. 5 of the drawings in which form the faces 7 will be located in planes diverging in the direction of the tread face 8 of the segment, and the said tread face of the segment will be given a slightly arcuate form so that when all of the segments are assembled in an annular series, the tread surface will be substantially cylindrical. It will be evident from the foregoing that in the completed segment the fibers or grain will still run radial to the axis of the wheel when the segment is in position or, in other words, will run radial to the arc described by the tread face 8 of the segment.

Due to this method of manufacture, a segment of the proper form is provided without cutting down or removing any of the material of the original blank and without destroying or breaking any of the fibers and furthermore all of the fibers are caused to assume a line of extent radial to the axis of the wheel or radial to the tread face of the segment. Therefore the segments will possess maximum strength and durability and there will be positively no likelihood of chipping or splintering of the segments.

The caster wheel herein described will be chiefly employed on trucks and as the wheels may at times be required to sustain exceptionally heavy loads, it will be desirable to employ means between the face plates of the wheel for supporting the segmental tread against inward collapse. Thus in the embodiment of the invention shown in Figs. 2 and 3 of the drawings a bracing or supporting member such as indicated in general by the numeral 10 may be employed and as illustrated this member comprises a hub 11 which is fitted onto the spindle 1, a web 12 which extends radially from the central portion of the hub, and a rim 13 which extends circumferentially of the web and against the outer surface of which the segments 5 are disposed to rest or bear as shown in the said figures. Also if found expedient, bolts or other suitable fastening devices 14 may be secured transversely through the web 12 of the supporting member so as to secure the plates against lateral distortion.

Having thus described the invention, what is claimed as new is:

1. The method of forming a segment of a wheel rim which comprises producing a blank of fibrous material in the form of a rectangular block in which the fibers terminate at two opposite faces and extend parallel to the planes of two adjacent and relatively opposite faces, and compressing the block, prior to application to the wheel, to segmental form by exerting pressure against the last mentioned faces and in increasing degree from one of the first mentioned faces to the other.

2. As a new article of manufacture, a wheel having a tread comprising a plurality of wood segments assembled in an annular series, the fibers in the segments extending along lines radial to the axis of the wheel and terminating at their outer ends at the tread faces of the segments, the segments being of gradually increasing density from their outer to their inner faces.

3. The method of forming a segment of a wheel rim which comprises producing a rectangular block of wood having two parallel faces, and in which block the fibers run parallel to said faces, and subjecting the block to pressure exerted against its said faces in a manner to compress the block to a greater degree near one face of the block at which the fibers terminate than at the opposite face of the block whereby the finished compressed block will be of segmental form and the previously parallel faces will be located in non-parallel planes.

In testimony whereof I affix my signature.

CHARLES W. MILLET. [L. S.]